(12) United States Patent
Foerster

(10) Patent No.: US 9,095,119 B2
(45) Date of Patent: Aug. 4, 2015

(54) METHOD AND APPARATUS FOR SUPPLYING ANIMALS KEPT IN RESTRICTED COMPARTMENTS WITH FEED

(71) Applicant: FOERSTER TECHNIK GmbH, Engen (DE)

(72) Inventor: Thomas Foerster, Bodman-Ludwigshafen (DE)

(73) Assignee: Foerster Technik GmbH, Engen (DE)

( * ) Notice: Subject to any disclaimer, the term of this patent is extended or adjusted under 35 U.S.C. 154(b) by 0 days.

(21) Appl. No.: 13/910,705

(22) Filed: Jun. 5, 2013

(65) Prior Publication Data
US 2013/0327275 A1   Dec. 12, 2013

(30) Foreign Application Priority Data

Jun. 6, 2012   (DE) .......................... 10 2012 104 913

(51) Int. Cl.
*A01K 5/02*   (2006.01)
*A01K 9/00*   (2006.01)

(52) U.S. Cl.
CPC ................. *A01K 5/02* (2013.01); *A01K 5/0266* (2013.01); *A01K 9/00* (2013.01)

(58) Field of Classification Search
CPC ....... A01K 1/0356; A01K 1/031; A01K 1/03; A01K 1/035; A01K 39/01; A01K 5/0266; A01K 5/0216; A01K 5/0275; A01K 31/17; A01K 39/0125; A01K 5/0208; A01K 5/0258; A01K 5/0283; A01K 61/02; B65G 11/206

USPC .............. 119/51.02, 51.11, 57.6, 57.92, 57.4, 119/456, 457
See application file for complete search history.

(56) References Cited

U.S. PATENT DOCUMENTS

| | | | |
|---|---|---|---|
| 3,097,627 A | | 7/1963 | Garcia |
| 3,204,607 A | | 9/1965 | Arnold et al. |
| 3,421,484 A | | 1/1969 | Flocchini |
| 3,587,529 A | * | 6/1971 | Weinert ........................ 119/51.5 |
| 3,628,506 A | | 12/1971 | Glasbergen |
| 3,698,361 A | * | 10/1972 | Lecce .......................... 119/51.11 |
| 3,722,475 A | * | 3/1973 | Wittern et al. .............. 119/51.11 |
| 3,776,194 A | * | 12/1973 | Conley .......................... 119/57.6 |
| 4,195,594 A | * | 4/1980 | Siciliano et al. ............. 119/57.6 |
| 4,337,729 A | * | 7/1982 | Peppler et al. ............... 119/57.6 |

(Continued)

FOREIGN PATENT DOCUMENTS

| | | |
|---|---|---|
| DE | 1960014 A | 7/1970 |
| DE | 3613887 A1 | 10/1987 |

(Continued)

OTHER PUBLICATIONS

German Search Report for DE 10 2012 104 913.0, dated May 8, 2013.

*Primary Examiner* — Yvonne Abbott-Lewis
(74) *Attorney, Agent, or Firm* — Bachman & LaPointe, P.C.

(57) ABSTRACT

In a method for supplying animals kept in restricted compartments (1 to 1.4) with feed by at least one dispensing unit (4) which is arranged movably along the restricted compartments, is connected to a control center (5) and has at least one dispensing element (9.1, 9.2), compartments (1.1) having group animals and compartments (1.2) for individual animals are intended to be jointly supplied with feed by a control center (5).

24 Claims, 2 Drawing Sheets

(56) References Cited

U.S. PATENT DOCUMENTS

| | | | |
|---|---|---|---|
| 4,379,439 A * | 4/1983 | Baur | 119/57.6 |
| 4,788,940 A | 12/1988 | Foerster | |
| 4,811,675 A * | 3/1989 | Segalla | 119/57.6 |
| 4,844,017 A * | 7/1989 | Lackner | 119/52.2 |
| 4,878,455 A * | 11/1989 | van der Veer | 119/57.5 |
| 4,981,107 A * | 1/1991 | Beaudoin et al. | 119/56.2 |
| 8,499,719 B2 * | 8/2013 | Brocca et al. | 119/57.92 |

FOREIGN PATENT DOCUMENTS

| | | |
|---|---|---|
| DE | 102006044721 A1 | 4/2008 |
| DE | 102008050715 A1 | 4/2010 |

* cited by examiner

METHOD AND APPARATUS FOR SUPPLYING ANIMALS KEPT IN RESTRICTED COMPARTMENTS WITH FEED

BACKGROUND OF THE INVENTION

The invention relates to a method for supplying animals kept in restricted compartments with feed by means of at least one dispensing unit which is arranged movably along the restricted compartments, is connected to a control center and has at least one dispensing element, and also to an apparatus therefor.

Animals which are kept in individual or group stalls are intended to be fed automatically several times per day. This applies, for example, to calves which are to be supplied with milk 3-4 times in the first 14 days. In the case of liquid feed, such as milk, the feed is intended to be delivered either in buckets in the stalls, or else the individual stalls are assigned automatic drinkers or suction teats connected to automatic drinkers. An example of such a system is described in DE 10 2008 050 715.6.

What is referred to as a mobile milk dispenser is also known, from DE 10 2006 044 721, with which milk is passed from stall to stall where it is transferred into corresponding dispensing units, for example into buckets. This is extremely time-consuming.

DE 36 13 887 A1 discloses a device for supplying animals with a liquid feed which is removable from an automatic drinker and is suppliable to a suction point via a hose line. Said suction point moves along a guide rail, but this can take place only very close to the stalls or in the latter themselves so that the animals come to the teat.

The present invention is based on the object of developing a method and an apparatus of the type mentioned above, with which a large number of animals in a large number of stalls can be supplied with feed several times per day with feed in a time-saving manner without said system having a substantial interfering effect on the entire operation.

SUMMARY OF THE INVENTION

The foregoing object is achieved by compartments having group animals and compartments for individual animals being jointly supplied with feed by a control center.

In this connection, it is possible, for example—but in a non-limiting manner—for the control center to be assigned in a stationary manner to the compartments having group animals and for the dispensing unit to be assigned movably to the compartments having individual animals. In this case, the control center can be arranged so as to be accessible between a plurality of compartments and from said compartments such that the corresponding dispensing elements are also reachable by a multiplicity of animals. By contrast, the movable dispensing elements themselves reach a multiplicity of animals kept individually.

The object is also achieved in that opposite compartments are jointly supplied with feed by a control center; also in this connection, it is possible, for example—but in a non-limiting manner—for the control center to be assigned to the compartments in a stationary manner and for the dispensing unit to be assigned thereto in a movable manner. The corresponding dispensing elements themselves reach a multiplicity of animals.

Conceivable control centers for feed include especially automatic drinkers, but also stores or the like which serve to prepare or temporarily store the feed. The direct connection to a milking robot is also conceivable, and therefore, for example, a specific calf can directly drink the milk from its own mother.

The dispensing elements for young animals will primarily be teats. However, the invention also includes other dispensing elements, such as drinking dishes, troughs, buckets or the like.

Of course, the entire system contains a corresponding means of detecting the feed quantity. This is undertaken, for example, via a hose pump, a flow sensor with flow measurement or the like, wherein the corresponding quantity is then also assigned again to the individual animal. For this purpose, for example, the teat or the stall can be assigned an identification system having, for example, a known RFID antenna, as a result of which the drinking animal is identified, the consumption is documented and is optionally restricted. If a container is carried along, for example in the intermediate container, a pair of scales which determines a corresponding stock of feed can also be arranged here. Therefore, measurements in the dispensing element, for example in the bucket, are also possible. The buckets are filled on the outward trip and checked on the return trip. A plurality of possibilities are conceivable here and are intended to be covered by the invention.

Furthermore, in a preferred exemplary embodiment of the invention, it is intended to check the animals. This can be carried out in multiple ways. Firstly, a camera can photograph the corresponding drinking animal. The camera can also determine the activity of the animal and, for example, can emit an alarm signal if the activity falls short of a certain level. The photo can also be used, for example, to draw a conclusion about the weight and the appearance and therefore about the condition of the animal. Video sequences showing the behavior of the animals can also be compiled.

Health parameters can also be derived via the suction speed, and also via the time which an animal requires in order to start sucking after the teat has been brought into its position. Alarm signals can also be emitted if certain values are fallen short of, especially if the entire quantity of feed has not been retrieved. It is determined, for example, how long the animal needs until it arrives at the teat or whether it remains lying down and does not stand up. A temperature measurement can also be undertaken at the teat itself.

The disinfecting of the teat is especially also of great importance. The dispensing element can preferably even be provided with a "teat turret", thus giving rise to the possibility of providing each animal with its own teat which is only used by the animal, or of cleaning the individual teats after use before said teats are used for the following animal.

The temperature of the feed should be influenced especially when keeping animals in the open air. For example, it is conceivable to heat the feed before the dispensing element. For this purpose, the teat, the dispensing unit, the tube system and/or an intermediate container are assigned corresponding insulating means and/or heating means which keep the feed at a necessary temperature.

A lock system is preferably also intended to be provided and is used to indicate to the animal the possibility of feed intake. For example, this may be an acoustic or optical signal, in particular a light during darkness. Also here, there are again many options which are intended to be covered by the invention.

The invention also includes an apparatus for supplying animals kept in restricted compartments with feed by means of at least one dispensing unit which is arranged movably along the restricted compartments and has a dispensing element, wherein a distance between dispensing element and the restricted compartment is changeable.

This means that the position of the teat with respect to the animal is now changeable and, secondly, said teat can be removed again from the remaining working region if, for example, said working region is required for other purposes. In this case, it is of secondary importance how said extension arm and the changing of the distance between dispensing element and the restricted compartment are configured technically. It is conceived of merely by way of example to design the extension arm as a bar, at the two ends of which a respective teat is arranged. The bar can be extended horizontally in relation to the dispensing unit sometimes more to the left and sometimes more to the right such that said bar can supply left rows of stalls and also right rows of stalls with feed by the rail. It is also conceivable for the extension arm to be designed to be telescopic such that it can be extended and retracted again on one or both sides of the dispensing unit.

Another possibility consists in designing the extension arm to be pivotable or rotatable through approx. 180° with respect to the dispensing unit such that sometimes a stall of the left row of stalls and sometimes a stall of the right row of stalls can be supplied with feed, but that, on the other hand, if the space between the rows of stalls is intended to be used, the extension arm is positioned vertically and is therefore out of the way.

Of course, two or more extendable or pivotable extension arms on the right and/or on the left, which can then also be assigned a plurality of pumps for the feed, are also conceivable.

The pivoting out or extension can be undertaken by motor; telescoping is also conceivable, in particular, pneumatically or hydraulically. However, purely mechanical deflecting means are also possible, for example via corresponding slotted guides or types of disk controllers or the like. All this is intended to be covered by the inventive concept.

The dispensing unit itself is preferably connected directly to a control center, for example to a corresponding automatic drinker or similar preparation station for the feed, a storage container, milking robot, etc. For example, a suction tube which is carried along during the movement of the dispensing unit can serve for this purpose. So that longer distances can also be spanned, a pump which assists the drinking can also be switched on in the suction tube. This can be controlled by a corresponding suction sensor.

It is also conceivable for the dispensing unit to be assigned an intermediate container, preferably with a plurality of chambers for different types of feed, said intermediate container being movable together with the dispensing unit. Said intermediate container is then connected to the corresponding preparation station or can be filled at the preparation station.

In a further exemplary embodiment of the invention, it is possible to fill, for example, water buckets in the stalls with water via a second system. For this purpose, a separate system can be provided, but integration into the existing system is also possible by corresponding valves being used to produce a connection to the intermediate container/automatic drinker for advancing feed and, as an alternative thereto, a connection to a water source. A similar procedure is also undertaken for cleaning the entire system and in particular the teats. The tube line and also the teats can be rinsed by means of water or a cleaning agent.

The manner in which the rail is configured and where the latter is arranged is intended likewise to be of secondary importance. It is conceivable, for example, for the rail itself to be incorporated into a roof structure such that the rail itself does not have any interfering effect whatsoever. The dispensing unit then hangs from the rail into the stall aisle and is arranged on the rail itself so as to be movable as customary.

By means of the overall arrangement, keeping animals which are younger than 14 days individually can be automated. If said animals then come into the group, they are already familiar with the automatic drinker. The automatic drinker is better utilized, since the rail system is "controlled" from the mixer thereof. However, the subsequent feeding in combination with a normal automatic drinker when keeping older animals in groups is also advantageous.

BRIEF DESCRIPTION OF THE DRAWINGS

Further advantages, features and details of the invention emerge from the description below of preferred exemplary embodiments and with reference to the drawing, in which.

DETAILED DESCRIPTION

Figure 1:
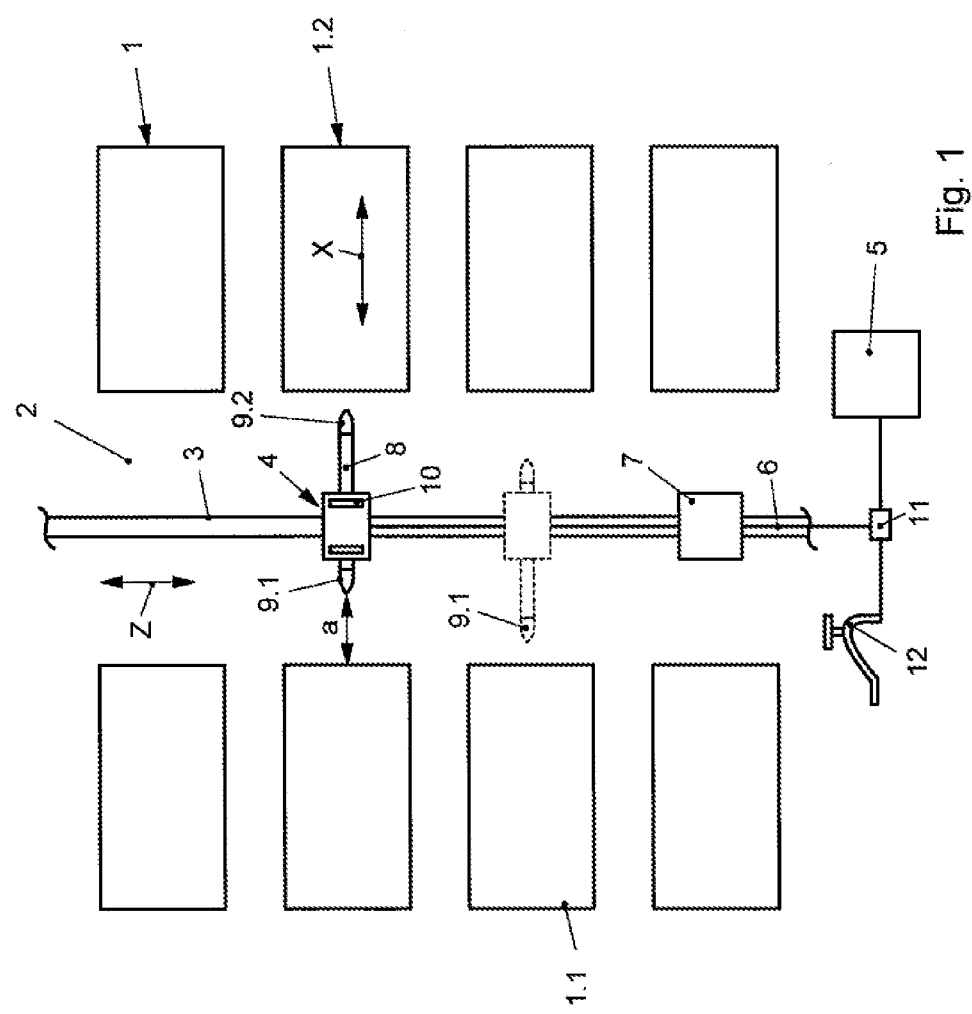
FIG. 1 shows a schematic illustration of a part of an apparatus according to the invention for supplying animals kept in restricted compartments with feed, in the use position.

According to FIG. 1, 1 identifies a row of stalls in which animals (not shown specifically) which are kept for rearing or fattening are located. In the present exemplary embodiment, two rows of stalls are arranged approximately parallel to each other, wherein a rail 3 runs in a corresponding stall aisle 2. A dispensing unit 4 for a feed is located movably on the rail 3. Said feed is prepared in a control center 5 and is supplied via a line 6 or a tube, pipe or the like either directly to the dispensing unit 4 or to an intermediate container 7 connected in between. If an intermediate container 7 is provided, said intermediate container can likewise be movable on the rail 3. Of course, the intermediate container can also be integrated in the dispensing unit.

According to the invention, the dispensing unit 4 is assigned an extension arm 8 on which respective teats 9.1 and 9.2 are located on both sides of the dispensing unit 4. Said extension arm 8 is arranged in the dispensing unit 4 so as to be displaceable or telescopic horizontally along the double arrow X such that a distance a between teat and stall 1 is changeable. It is indicated by dashed lines in FIG. 1 that the teat 9.1 was brought up close to the stall 1.1 into a previous use position such that the animal or animals kept in stall 1.1 can drink. The current use position of the dispensing unit 4, in which the teat 9.2 is extended toward stall 1.2 such that the animals located in stall 1.2 can drink, is then illustrated by solid lines. The entire operation is monitored by an identification system 10.

Figure 2:
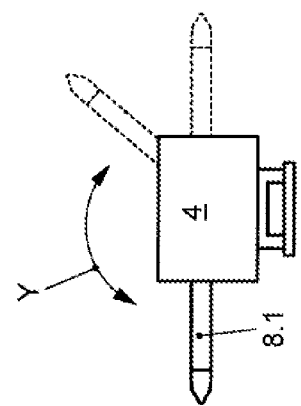
FIG. 2 shows an enlarged side view of another exemplary embodiment of a dispensing unit on a rail.

According to FIG. 2, it is indicated that, instead of a telescopic extension arm 8, a pivotable extension arm 8.1 can also be assigned to the dispensing unit 4, said extension arm being able to be pivoted from the left to the right corresponding to the double arrow Y. In this manner, feed can be administered sometimes to the animals of the row of stalls on the left side and sometimes to animals in the row of stalls on the right side, or else in an alternating manner.

The line 6 can also be assigned a valve 11 with which it is possible to produce a connection to the control center 5 and a connection to a water supply means 12. It is therefore firstly also possible to rinse the line 6 and/or the teats 9.1 and 9.2, but secondly also to fill, for example, water points in the individual stalls 1, wherein then a corresponding dispensing element is provided instead of the teats or next to the teats.

The present invention functions as follows:

The dispensing unit 4 is connected via the tube 6 either directly to the control center 5 or via the intermediate container 7 to the control center 5, wherein, in the latter case, a connection between container 7 and control center 5 can also be eliminated, but then the intermediate container 7 is filled at intervals.

Depending on requirements, the dispensing unit 4 is moved along the rail 3 and supplies the individual stalls 1 with feed. In this case, likewise depending on requirements, the extension arm 8 is extended to the left or right with respect to the dispensing unit 4 and therefore the particular teat 9.1 or 9.2 is arranged in the vicinity of the animal to be fed. However, part of the stall aisle 2 always remains free and can be walked along by the user irrespective of the feeding.

Of course, this feeding option is also possible with the pivotable extension arm 8.1 according to FIG. 2. The latter also has the advantage that, if it is not required, it can be placed vertically such that the user can pass on both sides of the rails without being disturbed by the extension arm, or, for example, dung or the like can be transported away.

Furthermore, cleaning of the entire supply system up to and including the teats 9.1 and 9.2 is then possible via the water supply means 12. However, the water supply means 12 also provides the option of filling water buckets present in the individual stalls 1 with water for the animals. The operation is then similar as for feeding the animals, but then a different dispensing element than the teat is used and, for example, the extension arm 8 is extended in a targeted manner such that the corresponding dispensing unit is located above the water bucket. This is possible without difficulty by control technology.

Figure 3:
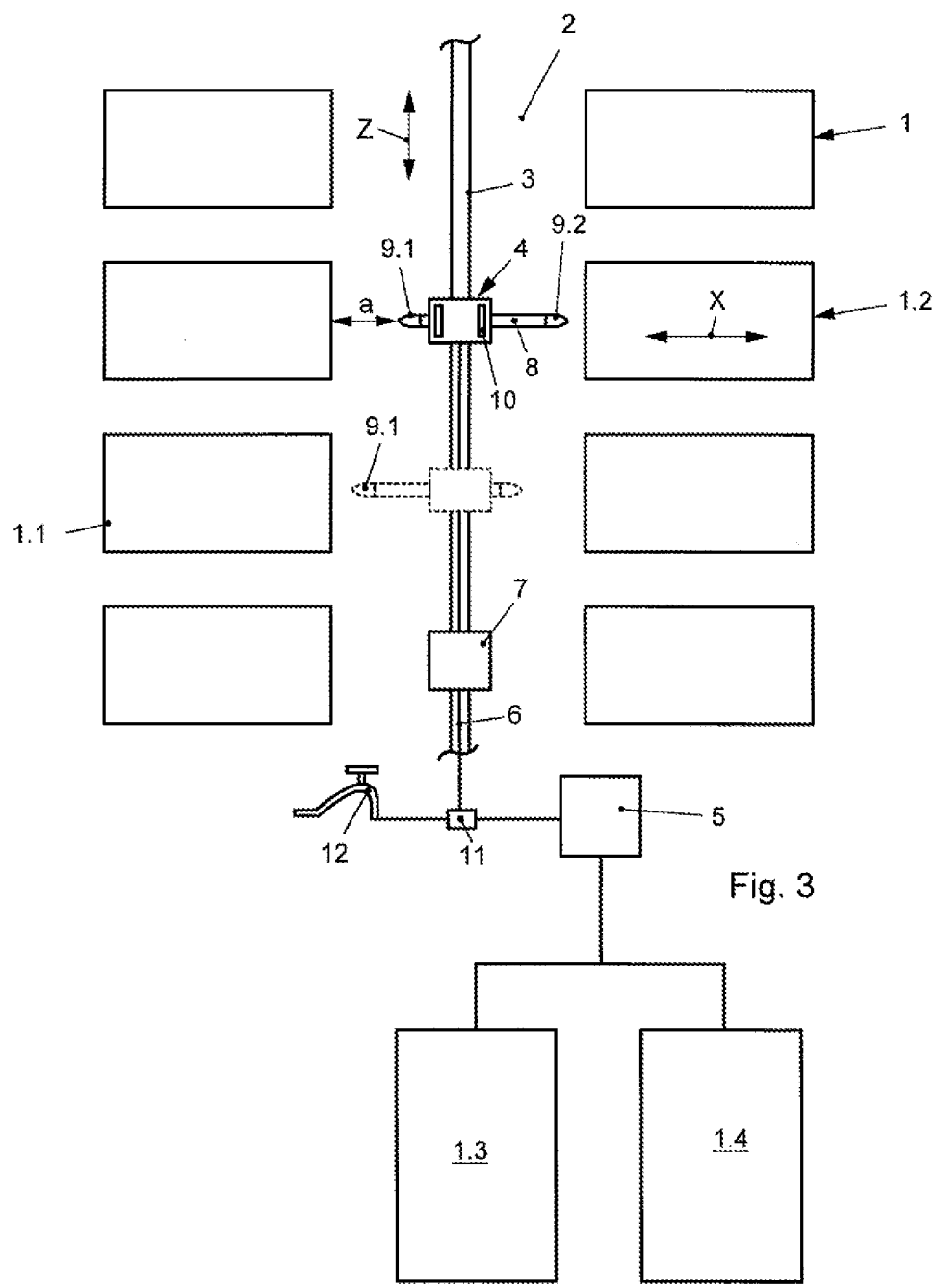
FIG. 3 shows a schematic illustration of another exemplary embodiment of a part of an apparatus according to the invention for supplying animals kept in restricted compartments with feed, in the use position.

According to FIG. 3, it is also conceivable to supply not only individual animals kept in compartments but also animals kept in groups with feed. For this purpose, larger stalls 1.3, 1.4 are connected to the control center 5.

The invention claimed is:

1. A method for supplying feed to animals kept in restricted compartments comprising the steps of:
   (a) providing a plurality of restricted compartments;
   (b) providing a dispensing unit for selectively dispensing an amount of feed to the plurality of restricted compartments;
   (c) providing a control center for supplying feed to the dispensing unit; and
   (d) moving the dispensing unit along the restricted compartments wherein the dispensing unit is provided with at least one dispensing element for supplying feed to opposite compartments of the control center and a distance (a) between the at least one dispensing element and the restricted compartments is variable during the movement of the dispensing unit.

2. A method according to claim 1, including monitoring the feed output and/or the feed intake with respect to at least a majority of the animals.

3. A method according to claim 2, wherein at least a majority of the animals is monitored by an identification system.

4. A method according to claim 1, wherein the amount of feed output is supported actively by means of at least one suction pump.

5. A method according to claim 1, including emitting an alarm in the event of irregularities in the feed and/or the animals.

6. A method according to claim 1, including controlling the temperature of the feed.

7. A method according to claim 1, including disinfecting the dispensing element.

8. An apparatus for supplying feed to animals kept in restricted compartments comprising:
   (a) a plurality of restricted compartments;
   (b) a dispensing unit for selectively dispensing an amount of feed to the plurality of restricted compartments;
   (c) a control center for supplying feed to the dispensing unit;
   (d) the dispensing unit includes a dispensing element spaced from the restricted compartments a distance (a); and
   (e) means for moving the dispensing unit wherein the distance (a) varies upon said moving.

9. An apparatus according to claim 8, wherein the dispensing element is arranged on an extension arm.

10. An apparatus according to claim 9, wherein the extension arm is configured on the dispensing unit so as to be horizontally extendable.

11. An apparatus according to claim 9, wherein the extension arm is arranged one of pivotably and rotatably in relation to the dispensing unit.

12. An apparatus according to claim 9, wherein the dispensing element is connected via a line to the control center for the feed.

13. An apparatus according to claim 12, wherein a pump is switched on in the line.

14. An apparatus according to claim 13, wherein the pump is provided with a suction sensor.

15. An apparatus according to claim 12, wherein one of the dispensing element and the line is assigned a heating device.

16. An apparatus according to claim 12, wherein the dispensing element is connected via a line to a movable intermediate container.

17. An apparatus according to claim 16, wherein the intermediate container is at least one of thermally insulated and heatable.

18. An apparatus according to claim 9, wherein one of the dispensing unit and the dispensing element is assigned a second system for supplying the animals with a further feed.

19. An apparatus according to claim 9, wherein at least one of the dispensing element and the dispensing unit has a lock system.

20. An apparatus according to claim 8, including a control valve associated with the dispensing element wherein different feeds are administered to the animals.

21. An apparatus according to claim 8, including identification systems for the animals.

22. An apparatus according to claim 8, wherein the dispensing unit is arranged movably on a rail.

23. An apparatus according to claim 8, wherein the dispensing unit has a device for determining the quantity of feed.

24. An apparatus according to claim 8, wherein the dispensing element has a cleaning device.

\* \* \* \* \*